United States Patent
Kitano et al.

[15] 3,659,690
[45] May 2, 1972

[54] TRANSMISSION CONTROL SYSTEM FOR VEHICLES

[72] Inventors: Shin Kitano; Yutaka Momose, both of Kariya, Japan

[73] Assignee: Aisin Seiki Kabushiki Kaisha, Kariya-shi, Japan

[22] Filed: Sept. 1, 1970

[21] Appl. No.: 68,607

[30] Foreign Application Priority Data

Sept. 3, 1969 Japan..................................44/83844
Nov. 12, 1969 Japan..................................44/90701

[52] U.S. Cl. ..........................192/3.33, 74/DIG. 1, 74/732, 192/3.24
[51] Int. Cl. ................F16d 25/12, F16d 33/12, F16d 33/02
[58] Field of Search .................192/3.27, 3.33, 3.24; 74/732, 74/DIG. 1

[56] References Cited

UNITED STATES PATENTS

| | | | |
|---|---|---|---|
| 3,010,342 | 11/1961 | Kelley | 74/732 |
| 3,320,967 | 5/1967 | Fiala et al. | 192/3.33 |
| 3,394,622 | 7/1968 | Chana | 74/DIG. 1 |

FOREIGN PATENTS OR APPLICATIONS

| | | | |
|---|---|---|---|
| 1,327,921 | 1963 | France | 192/3.33 |
| 950,049 | 1964 | Great Britain | 192/3.33 |

*Primary Examiner*—Mark M. Newman
*Assistant Examiner*—R. B. Rothman
*Attorney*—Berman, Davidson & Berman

[57] ABSTRACT

A transmission control system for vehicle having a transmission fluid actuated clutch means connected to a torque converter and a hydraulic brake means for arresting movement of the vehicle, comprising a source of pressurized fluid, first fluid passageway means connecting said fluid source with said clutch means, a regulator valve means disposed within said first passageway means and automatically controlling hydraulic pressure for said clutch means in response to the prime engine revolution rate, manual means to selectively regulate the passage of pressurized fluid to said clutch means, a second passageway means communicatively connecting said pressure fluid source with said torque converter disposed therein, a relief valve means interposed within said second passageway means and regulating output hydraulic pressure from said torque converter, and a control valve means to make said regulator valve means inoperative in response to activation of the brake pedal of the vehicle.

10 Claims, 4 Drawing Figures

INVENTOR
SHIN KITANO
YUTAKO MOMOSE

ATTORNEY

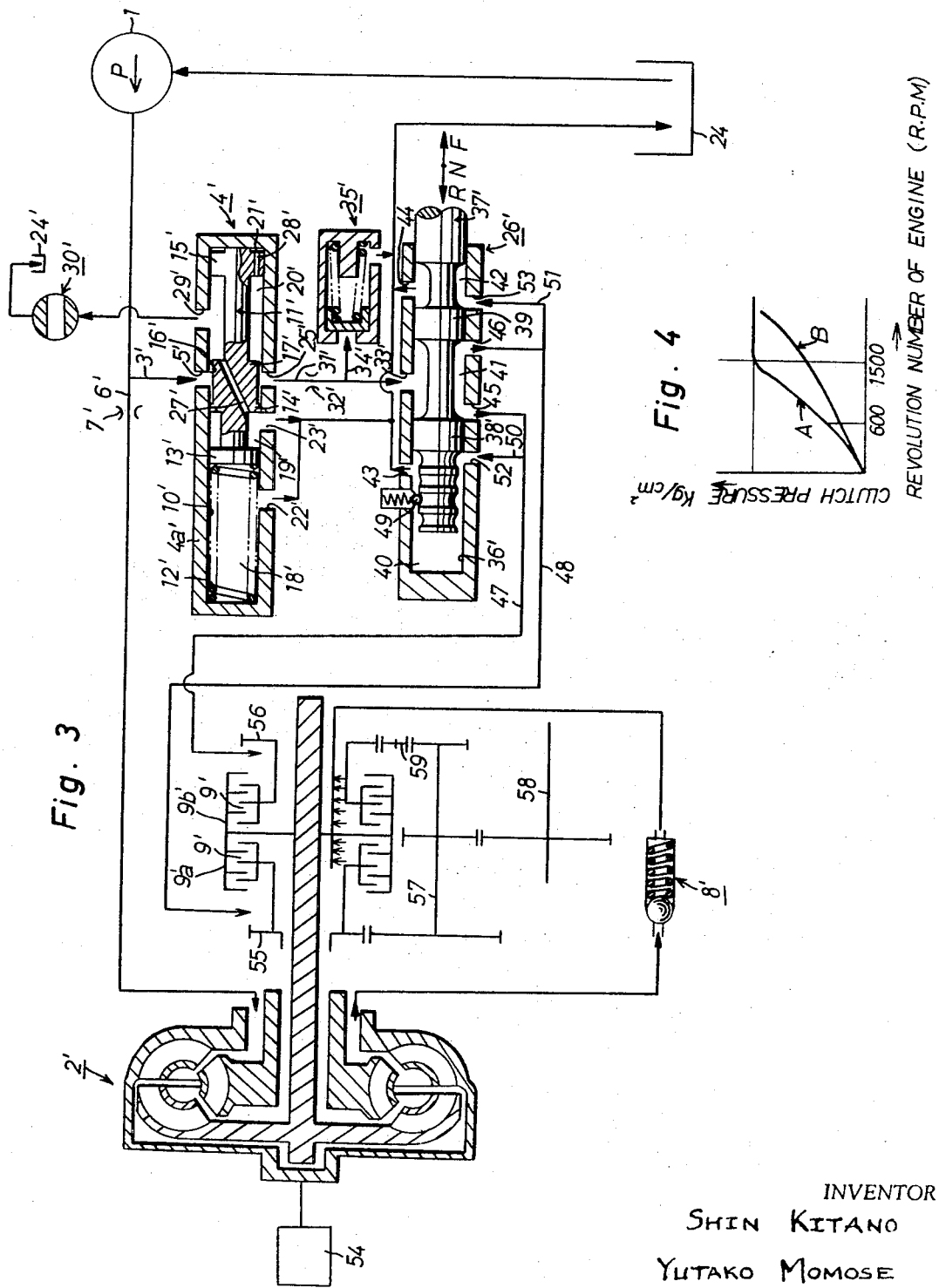

TRANSMISSION CONTROL SYSTEM FOR VEHICLES

The present invention relates to a transmission control system, and more particularly to a hydraulic control system for a vehicle having a transmission provided with fluid actuated clutch means connected to a torque converter and hydraulic brake means for arresting movement of the vehicle.

An industrial vehicle, such as a fork-lift truck with torque transmission means having a torque converter, a transmission having an input shaft driven by the torque converter ,and fluid actuated clutch means, is provided with a hydraulic pressure pump to supply the fluid actuated clutch means with pressurized operating fluid, the fluid discharging capacity of the hydraulic pressure pump being predetermined to be rather large, so that enough hydraulic pressure may be supplied to the fluid clutch means even at an idling revolution rate of the prime engine of the vehicle. This creates, however, rather large shocks to the vehicle due to knocking of the prime engine at starting movement of the vehicle, when the fluid clutch means is activated at the idling revolution rate of the prime engine of the vehicle. Conventional fork-lift trucks, and the like, have had such defects as causing damage to their prime engines by shocks created by activating operations of their fluid clutch means, and further, causing them to be unable to carry fragile goods, since in operation of such vehicles very frequent changes to forward and reverse are required, and also it is necessary to start and stop such vehicles at low revolution rates of their prime engine.

In order to eliminate the above-mentioned defects, conventionally a system has been adopted such as to reduce the quantity of pressurized fluid discharged from the hydraulic pressure pump and also to store it in an accumulator. In this type of system, however, the defect still remains that in making an urgent start of the vehicle on an inclined area with the rate of engine revolution accelerated, a delay in activating the clutch means caused by the accumulator makes the vehicle descend on the inclined area contrary to the operator's intention.

The most important object of the present invention is, therefore, to provide a hydraulic pressure control system for fluid actuated clutch means having a regulator valve means, said regulator valve means automatically controlling the quantity of pressure fluid supplied to the fluid actuated clutch means in response to the quantity of pressure fluid supplied from a source of pressure fluid including pressuring means therefor, so as to hold low hydraulic pressure for the fluid actuated clutch means at a low engine revolution rate to produce smooth torque transmission and to produce sure activation of the fluid actuated clutch means without delays in oeration at high engine revolution rates, thereby eliminating shocks on the vehicle due to engine knocking produced by starting and arresting the vehicle, especially with loads thereon, at low engine revolution rates, and also eliminating delays in activating the fluid actuated clutch means in the case of starting the vehicle suddenly on inclined areas at high engine revolution rate.

A second important object of the present invention is to provide a hydraulic pressure control system for fluid actuated clutch means having an orifice and an accumulator disposed within a fluid conduit supplying pressure fluid to the fluid actuated clutch means through the above-mentioned regulator valve means, said accumulator providing such hydraulic pressure for the fluid actuated clutch means in proportion to the revolution rate of the prime engine of the vehicle, whereby to prevent slipping of wet clutch plates within the fluid actuated clutch means.

A third important object of the present invention is to provide a hydraulic pressure control system for fluid actuated clutch means in which enough fluid is obtained for the wet clutch plates of the fluid actuated clutch means as coolant therefor and for the torque converter to hold a certain value of hydraulic pressure therein even with low hydraulic pressure in a pressure chamber of the regulator valve means.

A fourth important object of the present invention is to provide a hydraulic control system for fluid actuated clutch means having a control valve operatively connected with the regulator valve means, said control valve being activated by a brake pedal of the vehicle, so as to regulate operation of said regulator valve means in response to activation of the brake pedal, whereby full activation of the brake pedal makes the fluid actuated clutch means de-activated to prevent undesired slipping of the wet clutch plates.

A further important object of the present invention is to provide a hydraulic control system for fluid actuated clutch means which can be constructed simply and unexpensively, with sure and smooth operations.

The novel features that are considered characteristic of the present invention are set forth with particularity in the appended claims. The invention, itself, however, both as to its construction and its method of operation, together with additional objects and advantages thereof, will best be understood from the following description of the specific embodiments when read in connection with the accompanying drawings.

In the drawings:

FIG. 3 is a diagrammatic view, with parts in vertical cross-section, of another embodiment of a system constructed in accordance with the present invention.

FIG. 4 shows characteristic curves of the relationship between hydraulic pressure for the fluid actuated clutch means and the prime engine revolution rate, referring to the embodiment shown in FIG. 3.

Figure 1:
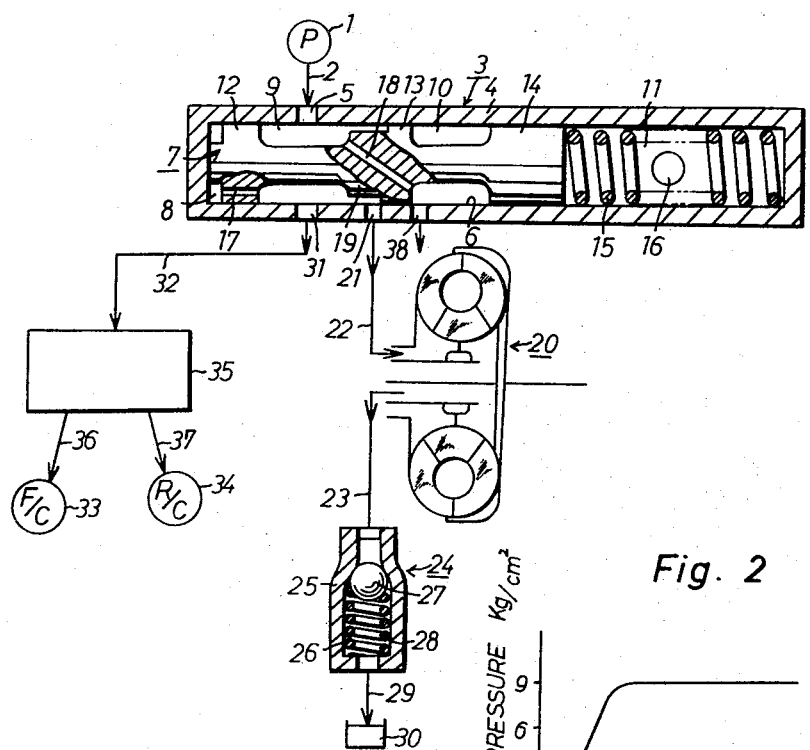
FIG. 1 is a diagrammatic view, with parts in vertical cross-section, of one embodiment of a system constructed in accordance with the present invention.

Described below is an embodiment of a device constructed in accordance with the present invention. Referring to FIG. 1, a regulator valve means 3 comprises a housing 4 which forms a bore 6 therein, a spool valve 7 is engaged reciprocatably to the axial direction thereof in the bore 6, and a coil spring 15 is installed in the bore 6 to bias the spool valve 7 leftwardly. The spool valve 7 is provided thereon with lands 12, 13 and 14 which divide the bore 6 into pressure chambers 8 and 9 and drain chambers 10 and 11. An inlet port 5 is provided in the wall of the housing and is connected to a hydraulic pressure pump 1 through a conduit 2, said pump 1 being driven by the prime engine of the vehicle. A drain opening 16 communicates with the drain chamber 11 to produce smoother rightward movements of the spool valve 7. An orifice 17 provided through the land 12 of the spool valve 7 connects the pressure chambers 8 and 9 with each other. A slant passageway 18 passes through the spool valve 7, connecting the pressure chamber 9 with the drain chamber 10. A land 19 with a smaller diameter than those of the lands 12, 13 and 14 is provided adjacent the left side of the land 13 of the spool valve 7 approximately at the central portion thereof. The land 19 forms an orifice with respect to an outlet port 21 which connects the pressure chamber 9 with a torque converter means 20 through a conduit 22. The torque converter means 20 is further connected with a relief valve means 24 through a conduit 23. The relief valve means 24 comprises a housing 25, a control ball 27, and a spring 28 biasing the control ball upwardly within a bore 26 of the housing 25. The control ball 27 normally closes the conduit 23 to hold hydraulic pressure within the torque converter means 20 up to a predetermined value. When the hydraulic pressure within the torque converter means 20 exceeds the said predetermined value, the relief valve means 24 opens to connect the conduit 23 to a conduit 29 and consequently to a reservoir 30. An outlet port 31 is provided on the housing 4 of the regulator valve means 3 and is connected with a manual control valve means 35 through a conduit 32, supplying the manual control valve means 35 with modulated hydraulic pressure from the regulator valve means 3. The manual control valve means 35 controls selection of fluid actuated clutch means 33 and 34 which are in communication with the manual control valve means 35, respectively, through conduits 36 and 37. When rightward movements of the spool valve 7 are made, overcoming the spring 15, the land 19 of the spool valve 7 faces a drain port 38 of the housing 4 to hold a certain value of hydraulic pressure in the pressure chamber 9.

The operation of the preferred embodiment described above will become clear from the following description. When the prime engine of the vehicle runs at approximately 500 revolutions per minute, an idling revolution rate, the hydraulic pressure pump 1 supplies pressure fluid at the rate of between 10 and 20 liters per minute to pressure chamber 9. This rate of pressure fluid flow is too small to operate the regulator valve means 3, and thus, the spool valve 7 remains in its normal position, under the biasing force of the spring 15. With the quantity of flow reduced by the orifice defined by the land 19 relative to the output port 21, pressure fluid flows into the torque converter means 20 through the outlet port 21 and the conduit 22 to lubricate the torque converter means 20. The pressure fluid reaches the relief valve means 24 through the conduit 23, modulated to about 1.5 kilograms per square centimeter, which is proper for the inside pressure of the torque converter means 20. At the same time, a certain amount of pressure fluid in the pressure chamber 9 runs into the drain chamber 10 through the slant passageway 18 to decrease hydraulic pressure in the pressure chamber 9. The diameter of the slant passageway is between 1.5 and 2.5 millimeters, which, in turn, holds hydraulic pressure in the pressure chamber 9 at between 2.5 and 3 kilograms per square centimeter. This hydraulic pressure is supplied to the manual control valve means 35 through the outlet port 31 and the conduit 32 to create shockless clutching operation of the clutch means 33 or 34. An acceleration of engine rotation approximately up to 1,000 revolutions perminute increases the quantity of pressure fluid discharged from the hydraulic pressure pump 1, the pressure fluid being supplied to the pressure chamber 9 through the conduit 2. Now the quantity of this pressure fluid exceeds the total quantity that flows out of the pressure chamber 9 through the slant passageway 18 and the orifice formed by the land 19. This causes the pressure fluid to pass to the pressure chamber 8 by way of the orifice 17 of the land 12 on the spool valve 7. The spool valve 7 consequently moves rightward, overcoming the biasing force of the spring 15 by the difference of the pressure-receiving areas. As a result, the land 19 moves to face the drain opening 38 and hydraulic pressure in the pressure chamber 9 is modulated to be approximately 8 kilograms per square centimeter. The pressure fluid is then delivered to the manual control valve means 35 through the outlet port 31 and the conduit 32 to produce engagement of the clutch means 33 or 34.

Figure 2:
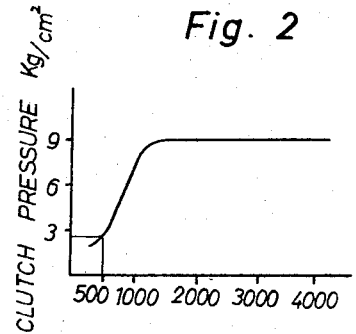
FIG. 2 is a characteristic curve showing the relationship between hydraulic pressure for the fluid actuated clutch means and the prime engine revolution rate, referring to the embodiment shown in FIG. 1.

The relation between the number of engine revolutions and the hydraulic pressure in the clutch means 33 and 34 is further explained by the characteristic curve in FIG. 2. The hydraulic pressure in the clutch means 33 and 34 is kept rather low when the prime engine of the vehicle runs at around the idling revolution rate. This eliminates most of the shock force on the vehicle at starting movements thereof. In the necessity of urgent starts, such inconvenience of delays of operation can be eliminated by shifting the selector of the manual control valve means 35 after the prime engine is accelerated up to about 1,000 revolutions per minute.

Described below, referring to FIGS. 3 and 4, is another embodiment of the device constructed in accordance with the present invention. A hydraulic pressure pump 1 communicates with a torque converter means 2' at the impeller side thereof. Pressure fluid discharged from the pump 1 is divided and part is delivered to an inlet port 5' of a regulator valve means 4' controlling operation of fluid actuated clutch means 9a and 9b through a conduit 3', and part to the torque converter means 2' through a conduit 6' and necessarily a restricted orifice 7' provided within the conduit 6'. The latter part of the pressure fluid goes through the torque converter means 2' and then flows through a relief valve means 8' into the clutch means 9a and 9b as coolant for wet clutch plates 9',9'. The clutch means 9a is employed to advance the vehicle, and the clutch means 9b is employed to reverse the vehicle.

The regulator valve means 4' comprises a housing 4a which forms a bore 10', a spool valve 11' is engaged reciprocatably to the axial direction thereof in the bore 10', and a coil spring 12' is installed in the bore 10' to bias the spool valve 11' rightwardly. The spool valve 11' is provided thereon with lands 13', 14' and 15' which divide the bore 11' into chambers 18', 19', 20' and 21'. Also, a land 17' is provided adjacent the right side of the land 14', the diameter of the land 17' being smaller than that of the bore 10' to form an orifice 16'. The chambers 18' and 19' are always open to a reservoir 24' respectively, by means of outlet ports 22' and 23'. The chamber 20' is a pressure chamber to allow pressure fluid flow therein through the inlet port 5' and to deliver it to a manual control valve means 26' through an outlet port 25'. A slant passageway 27' passes through the spool valve 11', connecting the pressure chamber 20' to the chamber 19'. The chamber 20' is, at the same time, connected with the pressure chamber 21' through an orifice 28' provided in the land 15' of the spool valve 11'. A rotary control valve means 30' communicates with the pressure chamber 20' through a port 29', being operated in response to stepping force applied onto a brake pedal (not shown in the Figure). The regulator valve means 4' becomes inoperative while the brake system of the vehicle is in operation, since pressure fluid in the pressure chamber 20' returns to the reservoir 24' through the rotary control valve means 30'. Pressure fluid discharged from an outlet port 25' of the regulator valve means 4' flows into the manual control valve means 26' through a conduit 31', an orifice 32' disposed within the conduit 31' and an inlet port 33' of the manual control means 26', said orifice 32' reducing the quantity of the pressure fluid. At the same time, the pressure fluid mentioned is divided and delivered to an accumulator 35' through a branch conduit 34'.

The manual control valve means 26' is employed to select the forward clutch means 9a, or the reverse clutch means 9b and is operated by a selector lever (not shown in the Figure). The manual control valve means 26' has a bore 36' in which a spool valve 37' is engaged reciprocatably to the axial direction thereof. The spool valve 37' is provided with lands 38' and 39. forming chambers 40, 41 and 42 within the bore 36'. The chambers 40 and 42 are always open to the reservoir 24', respectively, by means of outlet ports 43 and 44. The chamber 41 is a pressure chamber, and outlet ports 45 and 46 thereof are connected, respectively, to the servo-cylinders (not shown in the Figure) of the forward clutch means 9a and the reverse clutch means 9b.

While the spool valve 37' is kept in its neutral position by a ball 49, the conduits 47 and 48 are open, respectively, to a port 52 of the chamber 40 and a port 53 of the chamber 42, respectively, through branch conduits 50 and 51 thereof. Under these condition, therefore, pressure fluid flows into the pressure chamber 41 through the inlet port 33' and, in turn, to the conduits 47 and 48 through the outlet ports 45 and 46. The branch conduits 50 and 51, respectively, belonging to the conduits 47 and 48 lead the pressure fluid into the chambers 40 and 42 and consequently to the reservoir 24' through the outlet ports 43 and 44. The result is, therefore, that no hydraulic pressure is produced in the servo-cylinders of the clutch means 9a and 9b, whereby to keep the vehicle steady.

When the spool valve 37' of the manual control valve means 26' is shifted rightwardly, the ports 45 and 53 are closed, respectively, by the lands 38' and 39' of the spool valve 37'. The pressure fluid can be supplied from the pressure chamber 41 to the servo-cylinder of the forward clutch means 9a through the outlet port 46 and the conduit 48. This produces forward movement of the vehicle.

The leftward shift of the spool valve 37' of the manual control valve means 26' works to close the ports 46 and 52, respectively, by the lands 39' and 38' of the spool valve 37'. Thus, supply of the pressure fluid from the pressure chamber 41 to the servo-cylinder of the reverse clutch means 9b is enabled through the outlet port 45 and the conduit 47, whereby to reverse the vehicle. Reference numeral 54 shows the prime engine, forward and reverse gears being shown respectively by reference numerals 55 and 56. An output-shaft gear 57 is engaged with the forward gear 55 to drive an output shaft 58. An idler gear 59 is engaged with the reverse gear 56 and also the output-shaft gear 57, to transfer driving force of the reverse gear 56 to the output-shaft 58.

The operation of the above-mentioned embodiment of the device in relation with the present invention is to be described hereafter further in detail. The hydraulic pressure pump 1 discharges pressure fluid in proportion to the revolution rate of the prime engine 54. This pressure fluid flows into the pressure chamber 20' by way of the inlet port 5' of the regulator valve means 4' and the orifice 16' formed between the land 17' of the spool valve 11' and the inside wall surface of the bore 10' of the regulator valve means 4'.

While the revolution rate of the prime engine 54 is rather low, for example, from 600 to 1,500 revolutions per minute, the hydraulic pressure pump 1 discharges a small quantity of pressure fluid. Under this condition, most of the pressure fluid in the pressure chamber 20' is drained out through the slant passageway 27' of the spool valve 11' and the chamber 19'. The spool valve 11' remains, therefore, unmoved, staying in the position shown in FIG. 1. Thus, the hydraulic pressure in the pressure chamber 20' remains at a low value, and pressure fluid from the pressure chamber 20' goes into the manual control valve means 26' through the outlet port 25', the conduit 31', the orifice 32' and the inlet port 33' of the manual control valve means 26'. A portion of the pressure fluid is, on its way, led to the accumulator 35' by way of the orifice 32' and the branch conduit 34', the accumulator 35' working to keep hydraulic pressure to be supplied to the fluid actuated clutch means 9a and 9b at such a value as not to let the wet clutch plates 9',9' slip. This provides smooth engagement of the forward clutch means 9a or the reverse clutch means 9b, whereby to decrease shocks of the vehicle at its starts. At the same time, fluid as coolant for the wet clutch plates 9',9' runs into the clutch means 9a and 9b through a conduit 6' and an orifice 7' disposed within the conduit 6', the orifice 16' preventing it from flowing into the inlet port 5' through the main conduit 3'.

When the rotation rate of the prime engine 54 goes up over 1500 revolutions per minute, the quantity of pressure fluid discharged from the hydraulic pressure pump 1 is accordingly increased. The slant passageway 27' become insufficient for draining out pressure fluid within the pressure chamber 20'. The pressure fluid enters the chamber 21' through the orifice 28' to act on the right face of the spool valve 11', and the spool valve 11' is thus urged leftward, overcoming the biasing force of the spring 12'. The land 14' of the spool valve 11' works to make the outlet port 23' narrower and the pressure fluid in the pressure chamber 20' is drained out of the outlet port 23' through the orifice 16'. At this moment, the hydraulic pressure within the pressure chamber 20' reaches the required predetermined value, regardless of the effects of the orifice 32' and the accumulator 35', enough hydraulic pressure being now supplied to either of the servo-cylinders (not shown in the Figure) of the forward clutch means 9a or the reverse clutch means 9b. Shockless quick starts of the vehicle are, therefore, obtainable by stepping down on the accelerator pedal (not shown in the Figure).

Stepping down on the brake pedal (not shown in the Figure) operates the rotary valve 30' to drain out the pressure fluid within the pressure chamber 20' of the regulator valve means 4' in accordance with the degree of stepping-down force applied to the brake pedal. This returns the spool valve 11' toward the normal position shown in FIG. 3. This effect can be obtained because the orifice 16' formed between the land 17' of the spool valve 11' and the inside wall of the bore 10' is predetermined to maintain a stable condition regardless of the increase of the quantity of pressure fluid discharged from the hydraulic pressure pump 1 by the acceleration of the prime engine revolution rate. Thus, the hydraulic pressure within the servo-cylinders of the forward and reverse clutch means 9a and 9b is regulated to be at a low figure to enable semi-engagement of the clutch means 9a and 9b. When the brake pedal is released, the hydraulic pressure within the clutch means 9a and 9b increases approximately in proportion to the revolution rate of the prime engine 54 until the revolution rate comes up to around 1,500 revolutions per minute, as shown in FIG. 4 by the characteristic curve A. The hydraulic pressure within the clutch means 9a and 9b is controlled to be above the minimum, as shown by the characteristic curve B at every increase so as not to cause undesired slipping of the wet clutch plates 9', 9'.

Although certain specific embodiments of the present invention have been shown and described, it is obvious that many modifications thereof are possible. The present invention, therefore, is not intended to be restricted to the exact showing of the drawings and description thereof, but is considered to include reasonable and obvious equivalents within the scope of the appended claims and without departing from, or exceeding the spirit of the invention.

What is claimed is:

1. In a hydraulic control system for a vehicle comprising first hydraulic passage means connecting a source of pressure fluid to fluid actuated frictional engaging means, said source being provided with pressurizing means for providing pressurized fluid of the amount in proportion to the revolution rate of the prime engine of the vehicle, and a regulator valve means disposed within said first hydraulic passage means for controlling automatically hydraulic pressure supplied into said frictional engaging means therein, said regulator valve means comprising a housing forming a bore therein and having inside end walls, a spring installed within said bore, and a spool valve engaged in said bore reciprocatably to the axial direction thereof and biased to a normal position thereof by said spring, said spool valve including a plurality of lands thereon, a first pressure-chamber, a second drain-chamber and a third chamber accommodating said spring therein, all of said chambers being formed by said spool valve within said housing, said first and second chambers being interconnected by a passageway passing through one of the lands, and a drain-port connected to said second drain-chamber and controlled by said one of the lands, whereby when the pressure fluid source supplies said first pressure-chamber with low pressure fluid, the pressure fluid is drained out therefrom through said passageway, and when high pressure fluid is supplied to said first pressure-chamber, the spool valve is urged to move, overcoming said spring to keep a predetermined value of hydraulic pressure within the first pressure-chamber.

2. In a hydraulic control system as set forth in claim 1, wherein said lands of said spool valve comprises a first, a second, and a third land, said first pressure-chamber is formed between the first land and the second land provided with said passageway, said second drain-chamber is formed between the second and third lands, said third chamber is formed between the third land and one inside end wall engaging said spring therein, and a fourth chamber is further formed between the first land and the other inside end wall, said first and fourth chambers being interconnected by an orifice passing through the first land.

3. In a hydraulic control system as set forth in claim 2, wherein a second hydraulic passage means is provided for connecting said pressure fluid source to a torque converter, said second passage means including a return conduit leading to a reservoir, and a relief valve means is further interposed within said second passage means for modulating output hydraulic pressure from said torque converter, and said regulator valve means is disposed within said first and second passage means ahead of said fluid actuated frictional engaging means and said torque converter.

4. In a hydraulic control system as set forth in claim 3, wherein said regulator valve means comprises a smaller diameter land being adjacent the second land inside the first chamber and forming a further orifice with respect to the inside wall of the housing for controlling pressure fluid supplied into said second passage means connecting said first chamber to said torque converter.

5. In a hydraulic control system as set forth in claim 3, wherein said frictional engaging means comprises a forward and a reverse fluid actuated clutch means, and a manual control valve means is disposed within said first passage means for controlling the selection of a pair of fluid passages connected said forward and reverse clutch means to an outlet port of said regulator valve means, respectively.

6. In a hydraulic control system as set forth in claim 2, wherein a second passage means is provided for connecting said pressure fluid source to a torque converter, said second passage means being extended to said fluid actuated clutch means, and a relief valve means is further disposed within said second passage means between said torque converter and said frictional engaging means for modulating hydraulic pressure from said torque converter, and said regulator valve means is disposed within said first passage means.

7. In a hydraulic control system as set forth in claim 6, wherein an orifice and an accumulator are disposed within said first passage means between said regulator valve means and said fluid actuated frictional engaging means, said orifice being provided within said first passage means ahead of said accumulator.

8. In a hydraulic control system as set forth in claim 7, wherein said frictional engaging means comprises a forward and a reverse fluid actuated clutch means, and a manual control valve means is disposed within said first passage means between said accumulator and said forward and reverse clutch means for controlling the selection of a pair of fluid passages connected said forward and reverse clutch means to an outlet port of said regulator valve means, respectively.

9. In a hydraulic control system as set forth in claim 6, wherein said regulator valve means comprises a smaller diameter land being adjacent the second land inside the first chamber and forming a further orifice with respect to the inside wall of the housing, whereby when the pressure fluid source supplies said first pressure-chamber with low pressure fluid, the pressure fluid supplied through said first passage means is controlled by said orifice, and when said spool valve is urged to move overcoming said spring, said drain-port is controlled by said orifice.

10. In a hydraulic control system as set forth in claim 2, wherein a control valve means is provided in communication with an outlet port provided in the first chamber of said regulator valve means, said control valve means being operatively connected to a brake pedal of the vehicle, whereby full activation of the brake pedal makes said frictional engaging means de-activated since pressure fluid is drained out of the regulator valve means into a reservoir connected to said control valve means.

* * * * *